United States Patent [19]
Schopfer

[11] Patent Number: 5,797,640
[45] Date of Patent: Aug. 25, 1998

[54] GARMENT CARRIER

[76] Inventor: E. Kevin Schopfer, 474 Glen Rd., Weston, Mass. 02193

[21] Appl. No.: 841,196

[22] Filed: Apr. 29, 1997

Related U.S. Application Data

[60] Provisional application No. 60/016,423, Apr. 29, 1996.
[51] Int. Cl.$^6$ .............................. A45C 13/26; A47G 25/06
[52] U.S. Cl. .................... 294/152; 294/137; 294/165
[58] Field of Search ........................ 294/137, 138, 294/141–143, 145, 149, 152, 156, 159, 165, 171, 87.2; 223/85, 87, 88, DIG. 4; 224/313, 927

[56] References Cited

U.S. PATENT DOCUMENTS

| | | | |
|---|---|---|---|
| 1,982,276 | 11/1934 | West | 294/152 X |
| 2,248,234 | 7/1941 | Hickman et al. | 294/137 |
| 2,696,401 | 12/1954 | Church et al. | 294/87.2 |
| 2,711,922 | 6/1955 | Batkin | 294/87.2 |
| 2,740,657 | 4/1956 | Poupitch | |
| 2,769,587 | 11/1956 | Threeton | |
| 2,822,208 | 2/1958 | Then | 294/87.2 |
| 3,104,788 | 9/1963 | Wood | 294/165 |
| 3,495,760 | 2/1970 | Poth | 294/137 |
| 3,584,772 | 6/1971 | Robertson | 294/152 X |
| 3,606,967 | 9/1971 | Roberts | |
| 3,633,802 | 1/1972 | Webster | |
| 3,670,937 | 6/1972 | Bradshaw | 294/171 |
| 3,692,218 | 9/1972 | Friedman | |
| 3,705,674 | 12/1972 | Fisher | 294/165 |
| 3,744,600 | 7/1973 | Belland et al. | 294/142 |
| 3,804,310 | 4/1974 | Wheller | 294/142 |
| 3,885,723 | 5/1975 | Magnie | |
| 3,961,734 | 6/1976 | Threeton | 294/143 |
| 4,030,649 | 6/1977 | Potoroka | 294/149 |
| 4,060,169 | 11/1977 | Hildebrand et al. | 206/300 |
| 4,112,541 | 9/1978 | Tetradis | 294/137 |
| 4,284,219 | 8/1981 | Standel | 294/152 |
| 4,288,012 | 9/1981 | Doak | 294/143 |
| 4,296,959 | 10/1981 | Helbig | 294/143 |
| 4,335,839 | 6/1982 | Kellser et al. | 294/142 |
| 4,474,316 | 10/1984 | Philibert | 223/88 |
| 4,557,516 | 12/1985 | Usner | 294/143 |
| 4,558,896 | 12/1985 | Farnworth | 294/167 |
| 4,709,954 | 12/1987 | Beyda et al. | 194/142 |
| 4,895,295 | 1/1990 | Montgomery et al. | 294/156 |
| 5,178,430 | 1/1993 | Schopfer | 294/142 |
| 5,273,334 | 12/1993 | Schopfer | 294/137 |
| 5,288,120 | 2/1994 | Schopfer | 294/137 |

Primary Examiner—Johnny D. Cherry
Attorney, Agent, or Firm—Fish & Richardson P.C.

[57] ABSTRACT

A garment carrier, and a blank for forming a garment carrier, may be used once, or a few times, for transport of one or a few garments on hanger hooks, and then discarded. The carrier has a body of thin material, e.g. corrugated cardboard or biodegradable or other plastic, forming a handle and defining an orifice for receiving the free end of one or a few hangers.

29 Claims, 7 Drawing Sheets

GARMENT CARRIER

This application claims the benefit of U.S. Provisional application Ser. No. 60/016,423, filed Apr. 29, 1996.

BACKGROUND OF THE INVENTION

The invention relates to a device for carrying one or a few garments on hangers, and in particular to such a device which may be used once, or a few times.

When transporting one or a few garments, e.g. after purchase or dry cleaning, the garments are usually on hooked hangers. The hooks, which may be of different shapes and types, can create a hazard and/or an annoyance as they become engaged on clothing and anything else that passes within range. The collection of hooks is often bulky, and it is often a chore or even painful to carry one or more garments for any distance or period of time. It is also difficult to engage the hooks as a unit, e.g. on the garment hook in an automobile or over clothes racks or the like. Finally, if the hooks are not secured together in a manner to be handled as a unit, the unengaged hanger, and the clothing placed upon it, may be dropped, or even lost.

In my prior patents, Schopfer U.S. Pat. No. 5,273,334 and U.S. Pat. No. 5,288,120, I have described garment carriers and blanks, formed, e.g., of cardboard or other suitable material.

Others have also thought to provide a case for garment hooks to assist travelers using a garment or suit bag. For example, Threeton U.S. Pat. No. 2,769,587 describes a tubular case which opens along a central vertical axis and provides a ring for receiving the ends of the hangers. Magnie U.S. Pat. No. 3,885,723 describes a carrier device which is flexed to permit a hanger hook to be inserted into an elongated cavity. Doak U.S. Pat. No. 4,288,012 describes a handle which defines a magazine for receiving garment hanger hooks to be secured by a removable retainer pin.

SUMMARY OF THE INVENTION

According to one aspect of the invention, a garment carrier formed of a thin piece of material comprises a body having an upper region defining a handle opening extending therethrough, and a lower region defining second and third orifices for receiving a free end of one or more garment hanger hooks therethrough. The body is formed by an upper portion defining a first orifice extending therethrough and a lower portion defining a second orifice extending therethrough, the upper and lower portions being joined in a hinged connection along a first horizontal edge and fold line, the first and second orifices being disposed in registration and defining the handle opening. The third orifice has a first region defined by the upper portion and a second region defined by the lower portion, the orifice being intersected by the first horizontal edge and fold line, and the first and second regions generally in registration and defining a first hanger opening. The fourth orifice also has a first region defined by the upper portion and a second region defined by the lower portion, the fourth orifice being intersected by the first horizontal edge and fold line and having its first and second regions generally in registration and defining a second hanger opening.

Preferred embodiments of this aspect of the invention may include one or more of the following additional features. The garment carrier further comprises a handle flap joined to the body in a hinged connection along a generally horizontal edge and fold line of at least one or both of the first orifice and the second orifice. Preferably, the garment carrier further comprises an exposed handle surface defined by the handle flap between the generally horizontal edge and fold line and a second generally horizontal edge and fold line lying generally parallel thereto. More preferably, the handle flap is disposed to extend through the first orifice and the second orifice. The handle flap is formed by material of the body dislodged from one of the first orifice and the second orifice. The garment carrier further comprises a first handle flap joined to the body in a hinged connection along a lower, generally horizontal edge and fold line of the first orifice and a second handle flap joined to the body in a hinged connection along a lower, generally horizontal edge and fold line of the second orifice. The garment carrier further comprises a hanger flap joined to the body in a hinged connection along a generally vertical edge and fold line of at least one or both of the third orifice and the fourth orifice. Preferably, the hanger flap is formed by material of the body dislodged from one of the third orifice and the fourth orifice. The garment carrier further comprises a securement element releasably joining the upper portion of the body with the lower portion of the body in face-to-face relationship. The thin piece of material is formed of plastic or a biodegradable material, e.g. corrugated cardboard or plastic.

According to another aspect of the invention, a blank of corrugated cardboard and the like for forming a garment carrier comprises a body having an upper portion defining a first orifice extending therethrough, and a lower portion defining a second orifice extending therethrough, the upper portion and the lower portion being joined in a hinged connection along a first horizontal edge and fold line, the first and second orifices, with the blank in a first, flat state, being spaced uniformly at opposite sides from the first horizontal edge and fold line, and the orifices, with the blank in a second, folded state at the first horizontal edge and fold line, being disposed in registration and defining a handle opening. The body further defines third and fourth orifices extending therethrough, first regions of each being defined by the upper portion and second regions of each being defined by the lower portion, the orifices being intersected by the first horizontal edge and fold line. Each of the third and fourth orifices, with the blank in the second, folded state at the first horizontal edge and fold line, has its first region and its second region generally in registration and defining a hanger opening.

Preferred embodiments of this aspect of the invention may include one or more of the following additional features. The first horizontal edge and fold line generally bisects the body, the third orifice and/or the fourth orifice. The first orifice has an upper, generally horizontal edge and fold line, and the blank further comprises a first handle flap, the upper portion and the first handle flap being joined in a hinged connection along the upper, generally horizontal edge and fold line. The second orifice has a lower, generally horizontal edge and fold line, and the blank further comprises a second handle flap having a surface, the lower portion and the second handle flap being joined in a hinged connection along the lower, generally horizontal edge and fold line. The first orifice has a second, upper, generally horizontal edge and fold line lying generally parallel to the first upper, generally horizontal edge with an exposed handle surface defined therebetween by the handle flap. At least one or both of the third and fourth orifices has a generally vertical side edge and fold line, and the blank further comprises a first hanger flap, the upper portion and the lower portion and the first hanger flap being joined in a hinged connection along the generally vertical side edge and fold line. The thin piece of material is formed of a biodegradable material.

According to another aspect of the invention, a method for engaging a garment hanger hook in a blank for forming a garment carrier to transport a garment on the hanger comprises the steps of (with the blank comprising a body having an upper portion defining a first orifice extending therethrough and a lower portion defining a second orifice extending therethrough, the upper portion and the lower portion being joined in a hinged connection along a first horizontal edge and fold line, and the body further defining third and fourth orifices extending therethrough, first regions of the third and fourth orifices being defined by the upper portion and second regions of the third and fourth orifices being defined by the lower portion, the third and fourth orifices being intersected by the first horizontal edge and fold line): inserting a free end of the hanger hook through one of the third and fourth orifices in a first direction relative to a plane of the body and then through the other of the third and fourth orifices in a second direction relative to a plane of the body, the second direction being opposite to the first direction, folding the body at the first horizontal edge and fold line to bring the upper portion of the body into opposition to the lower portion of the body, with a mid-region of the hanger hook extending between the third and fourth orifices disposed therebetween, and securing the upper portion to the lower portion, with the first and second orifices in registration to form a handle opening.

Preferred embodiments of this aspect of the invention may include one or more of the following additional features. The method comprises the further step of dislodging material from at least one of the first and second orifices along a generally horizontal hinge and fold line joining the dislodged material to the body, dislodged material forming a handle flap extending through the first and second orifices and defining an exposed handle surface for cushioning the load. The method comprises the further step of dislodging material from at least one of the third and fourth orifices along a generally vertical hinge and fold line joining the dislodged material to the body, the dislodged material forming a hanger flap for reinforcing the garment hanger hook carrying region.

Objectives of the invention include providing a device for carrying one or few garments on hangers, the device being low in cost for both materials and labor, and being discardable after, e.g., a single use. The device may also be formed of materials that have been and/or can be recycled.

Other features and advantages will be seen from the following description of a presently preferred embodiment, and from the claims.

DESCRIPTION OF THE PREFERRED EMBODIMENT

Figure 1:
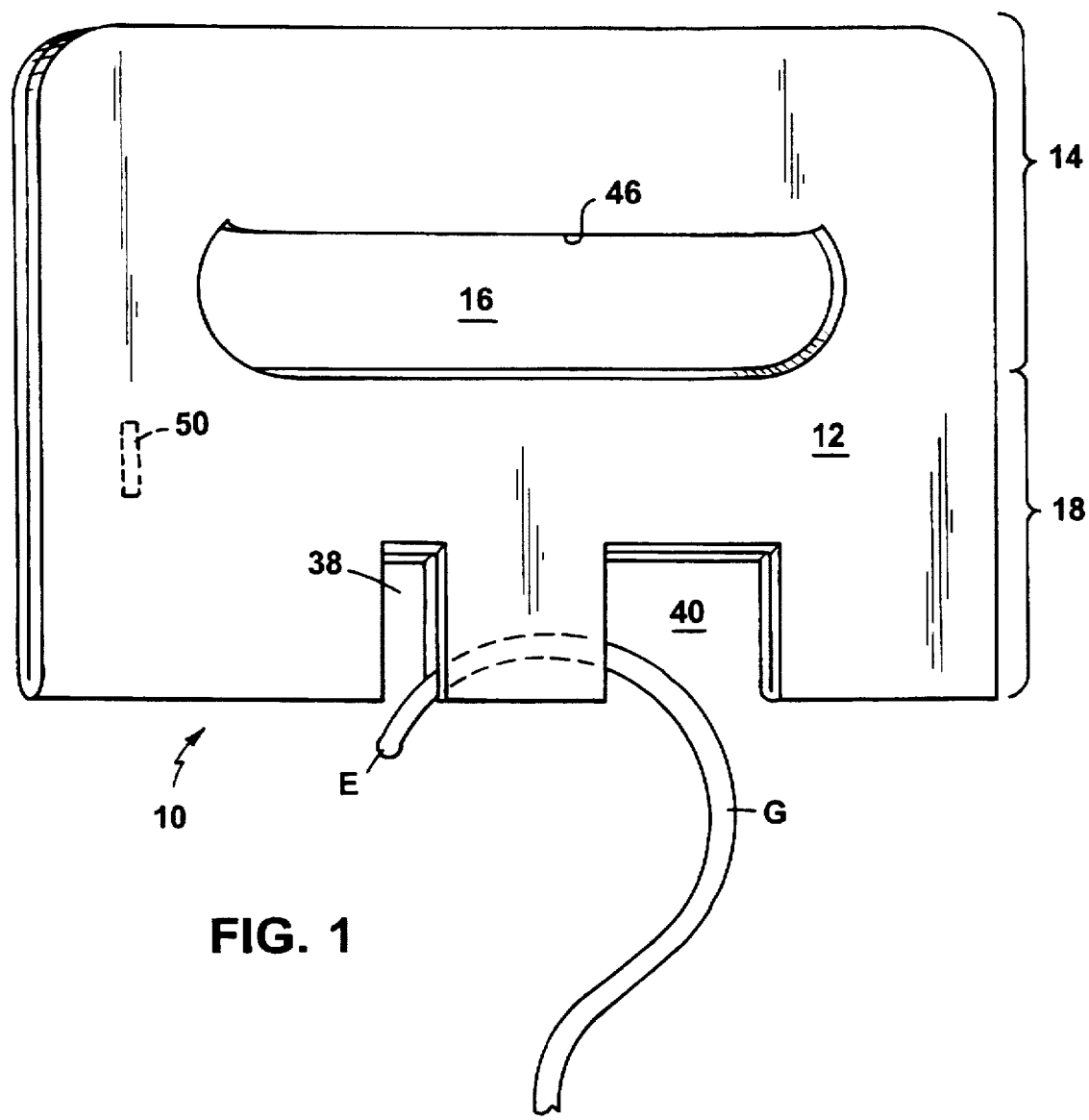
FIG. 1 is a front perspective view of a garment carrier of the invention.
Figure 2:
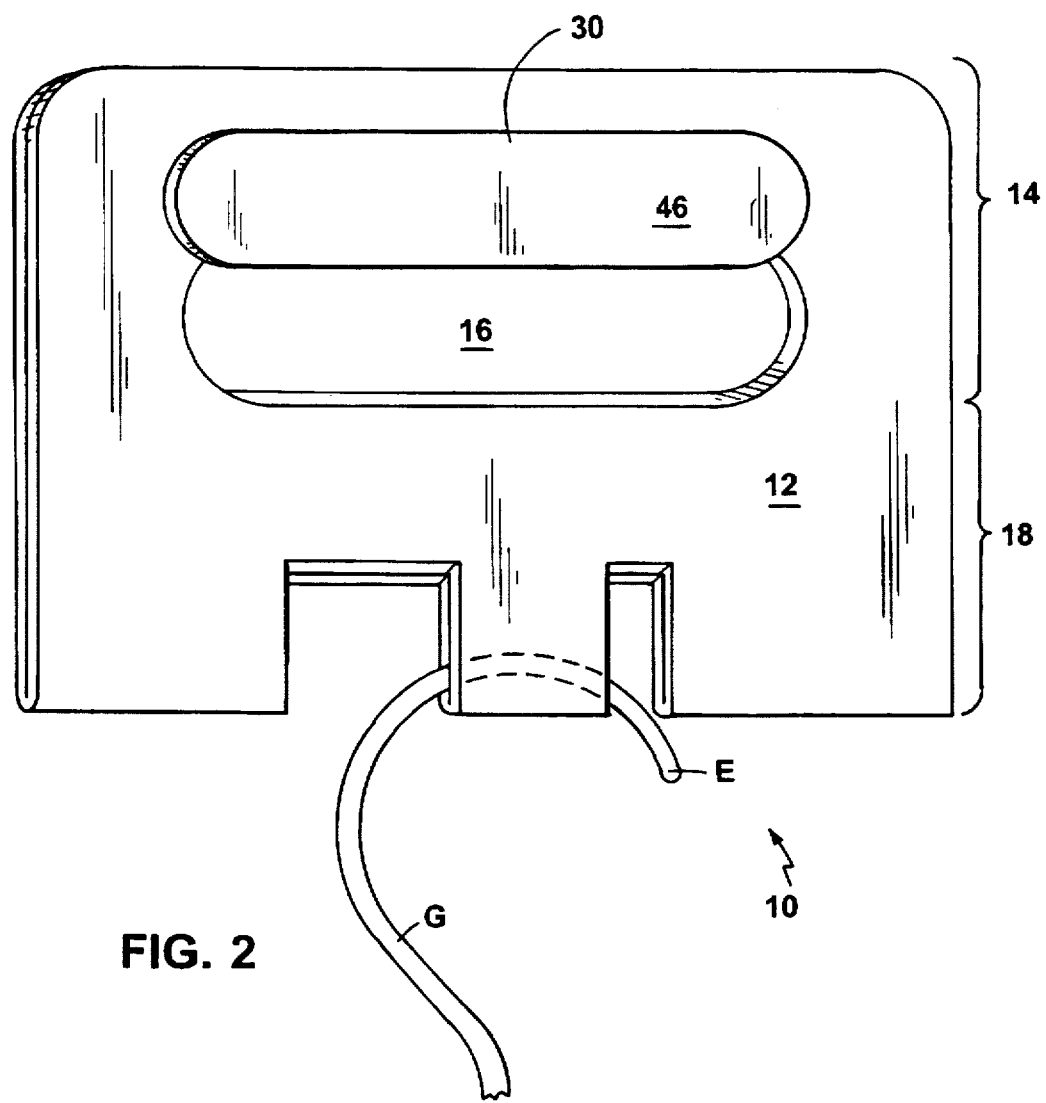
FIG. 2 is a rear perspective view the garment carrier of FIG. 1.

Referring to FIGS. 1 and 2, a garment carrier 10 of the invention has a body 12 having an upper region 14 defining a handle opening 16, and a lower region 18 for receiving and retaining one or a few hanger hooks, G, for transport and storage of garments.

Figure 3:
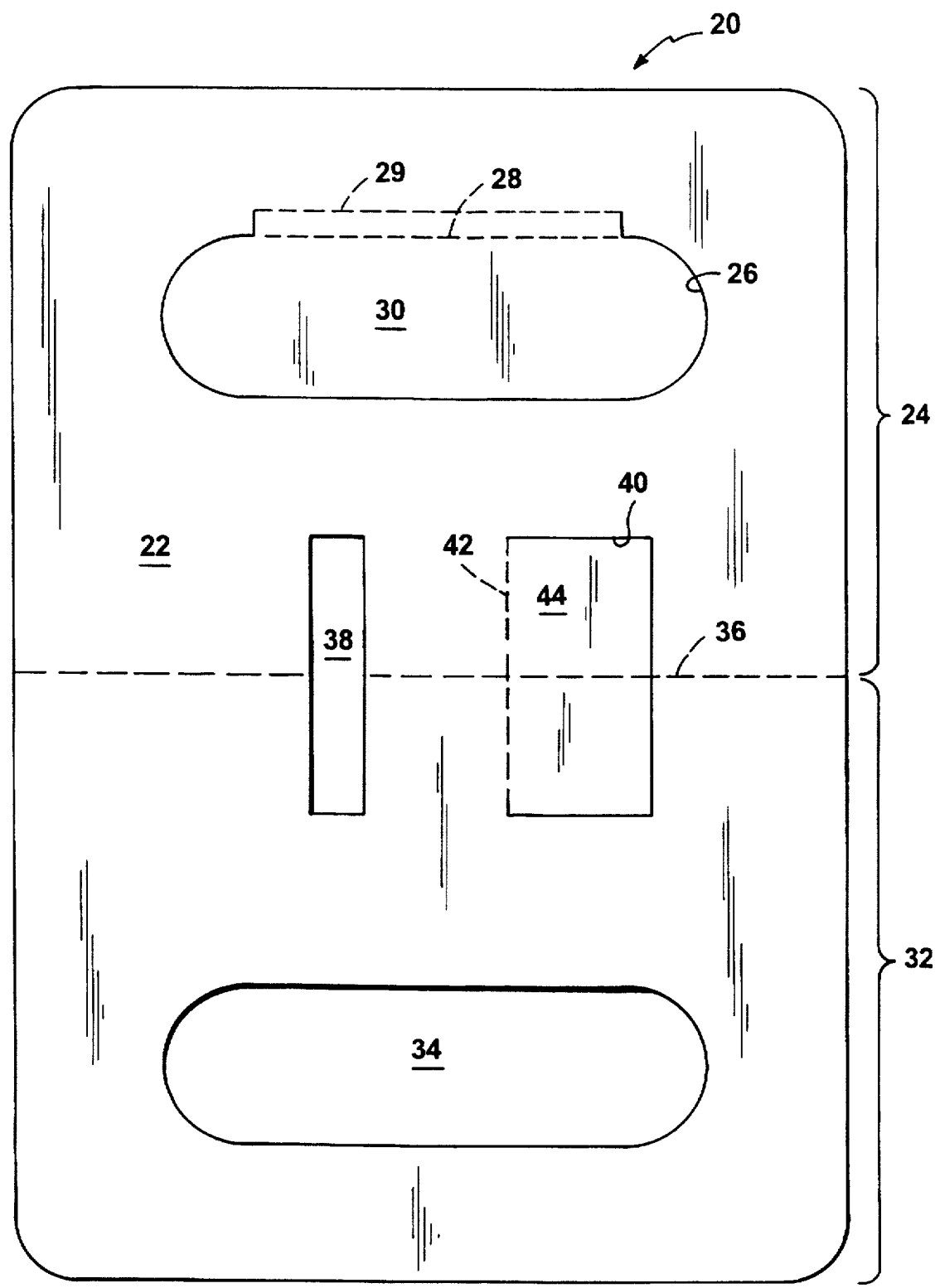
FIG. 3 is a plan view of a blank for forming the garment carrier of FIG. 1.

Referring now also to FIG. 3, the garment carrier 10 is formed from a blank 20 of a thin piece of suitable material such as plastic or a biodegradable material such as corrugated cardboard or plastic.

The blank 20 has a body 22 having an upper portion 24 defining a first orifice 26 bounded by a first, generally horizontal edge defining first and second generally parallel fold lines 28, 29 joining handle flap 30 to the body, and a lower portion 32 defining a second orifice 34 extending therethrough, the upper body portion 24 and the lower portion 32 joined along a second, generally horizontal line defining a second fold line 36.

The body 22 further defines a third orifice 38 extending therethrough and a fourth orifice 40 bounded by a third, generally vertical edge defining a third fold line 42 joining hanger flap 44 to the body, the second fold line 36 generally horizontally bisecting the body 22, and also bisecting the third orifice 38 and the fourth orifice 40.

By way of example only, in the preferred embodiment shown, the body 22 of blank 20 is about 8¾ inches high and about 5¾ inches wide. The first orifice 26 is about 3¾ inches wide by about 1¼ inches high. The second orifice 34 is also about 3¾ inches wide by about 1¼ inches high. The third orifice 38 is about ⅛ inch wide and about 2 inches high. The fourth orifice 40 is about 1 inch wide and also about 2 inches high.

Referring now also to FIGS. 1, 4, 5 and 6, to form the garment hanger 10 of the invention from the blank 20, the material in the third orifice 38 is removed, and the material in the fourth orifice 40 is dislodged and the flap 44 is folded along fold line 42 toward engagement with the inner surface 48 of the body 22, thereby to provide a region of reinforcement for supporting garment hangers, G, to be transported in the carrier 10.

Figure 4:
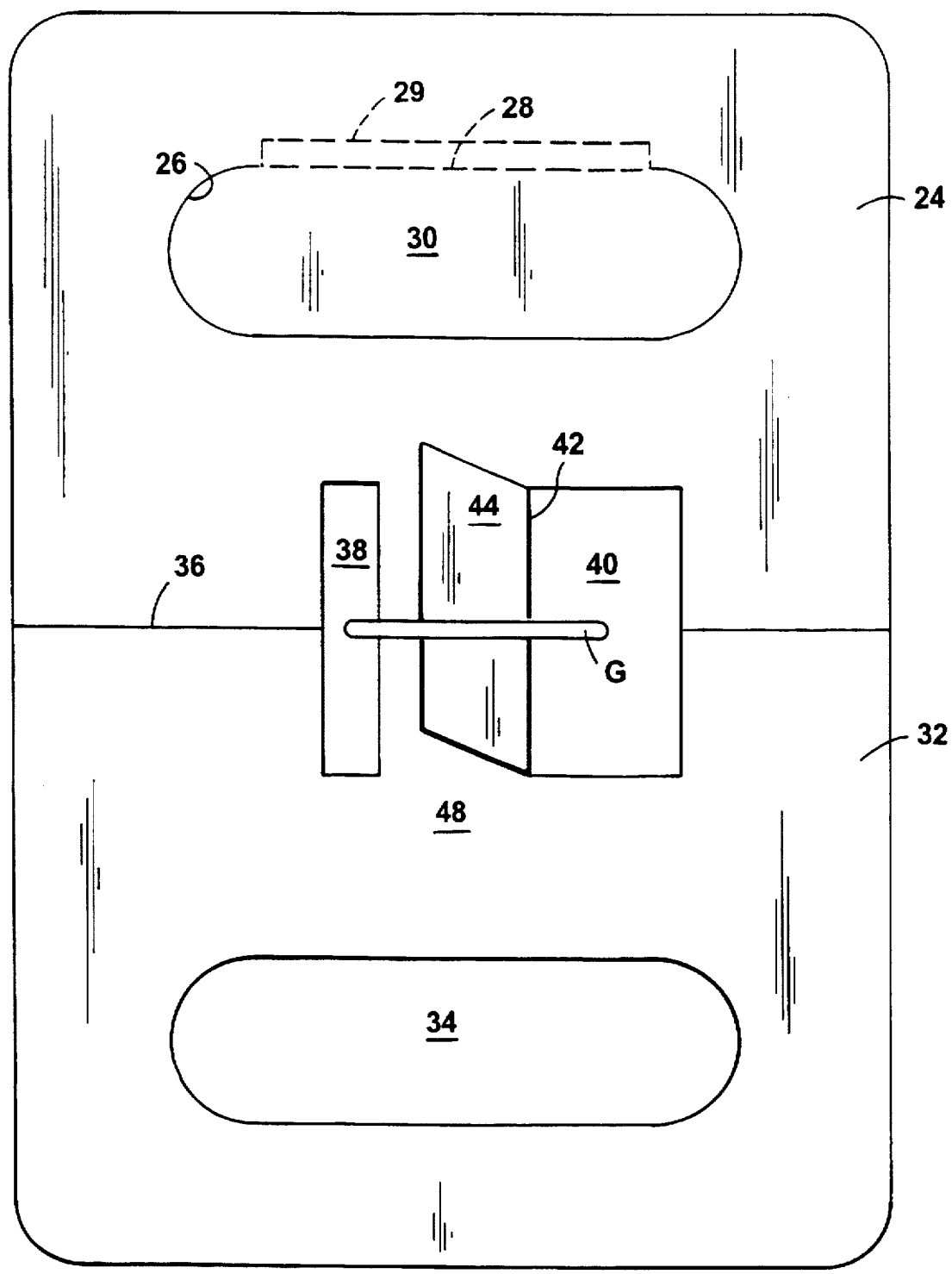
FIGS. 4, 5 and 6 are somewhat diagrammatic sequential views showing formation of the blank of FIG. 3 into a garment carrier of the invention, FIG. 4 being a plan view, and FIGS. 5 and 6 being end views.

Referring now to FIG. 4, the free end, E, of one or more garment hangers, G, is placed first through, e.g., the fourth orifice 40, and then into the third orifice 38.

Figure 5:
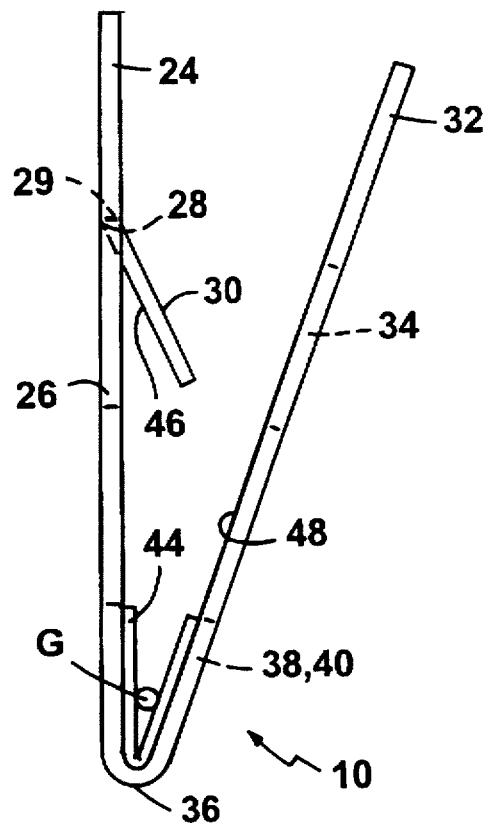
Figure 6:
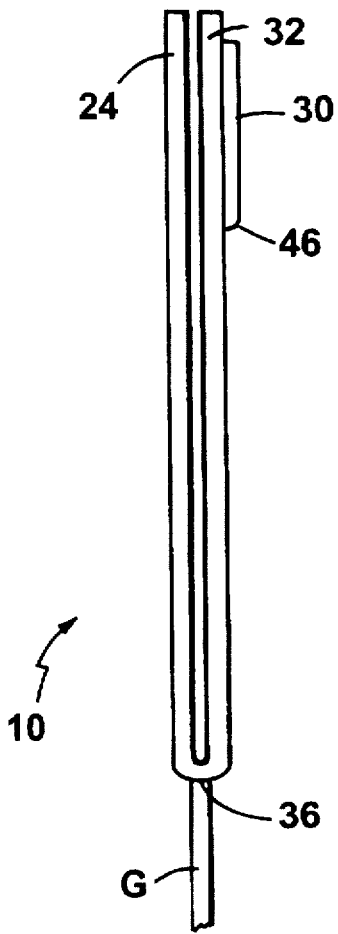

Referring next to FIGS. 5 and 6, the body 22 is next folded at horizontal fold line 36 to fold the lower portion 32 upon the upper portion 24, with the orifices 26, 34 generally in registration. The handle flap 30, hingedly joined to the upper portion 24 at orifice 26, is folded at lines 28, 29 to pass through orifices 26 and 34, placing the exposed handle surface 46 (FIGS. 1, 2 and 6) of flap 30 in a position to distribute the weight of the carrier and garment(s) for improved comfort for the user.

Figure 7:
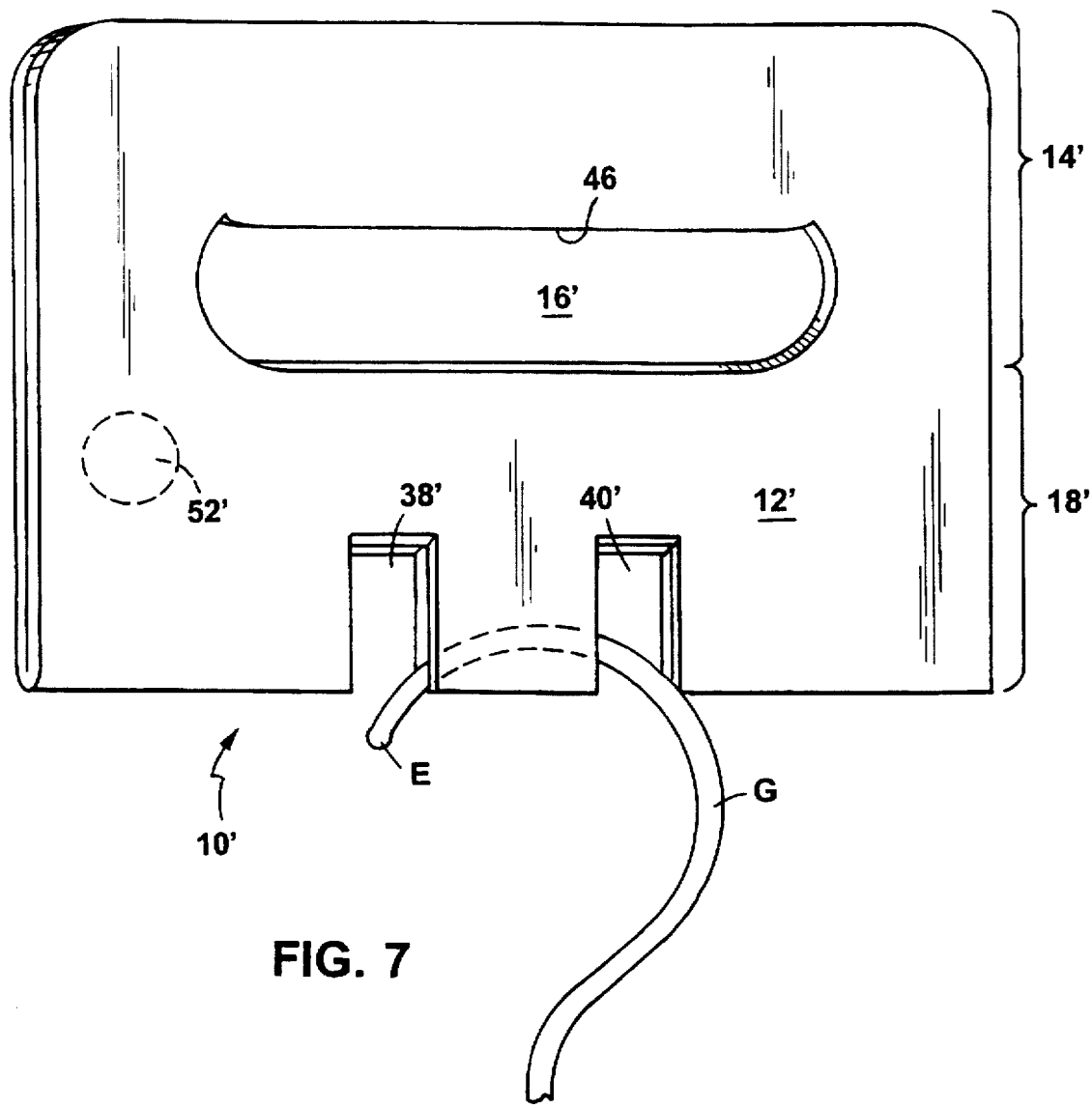
FIG. 7 is a front perspective view of another embodiment of a garment carrier of the invention.
Figure 8:
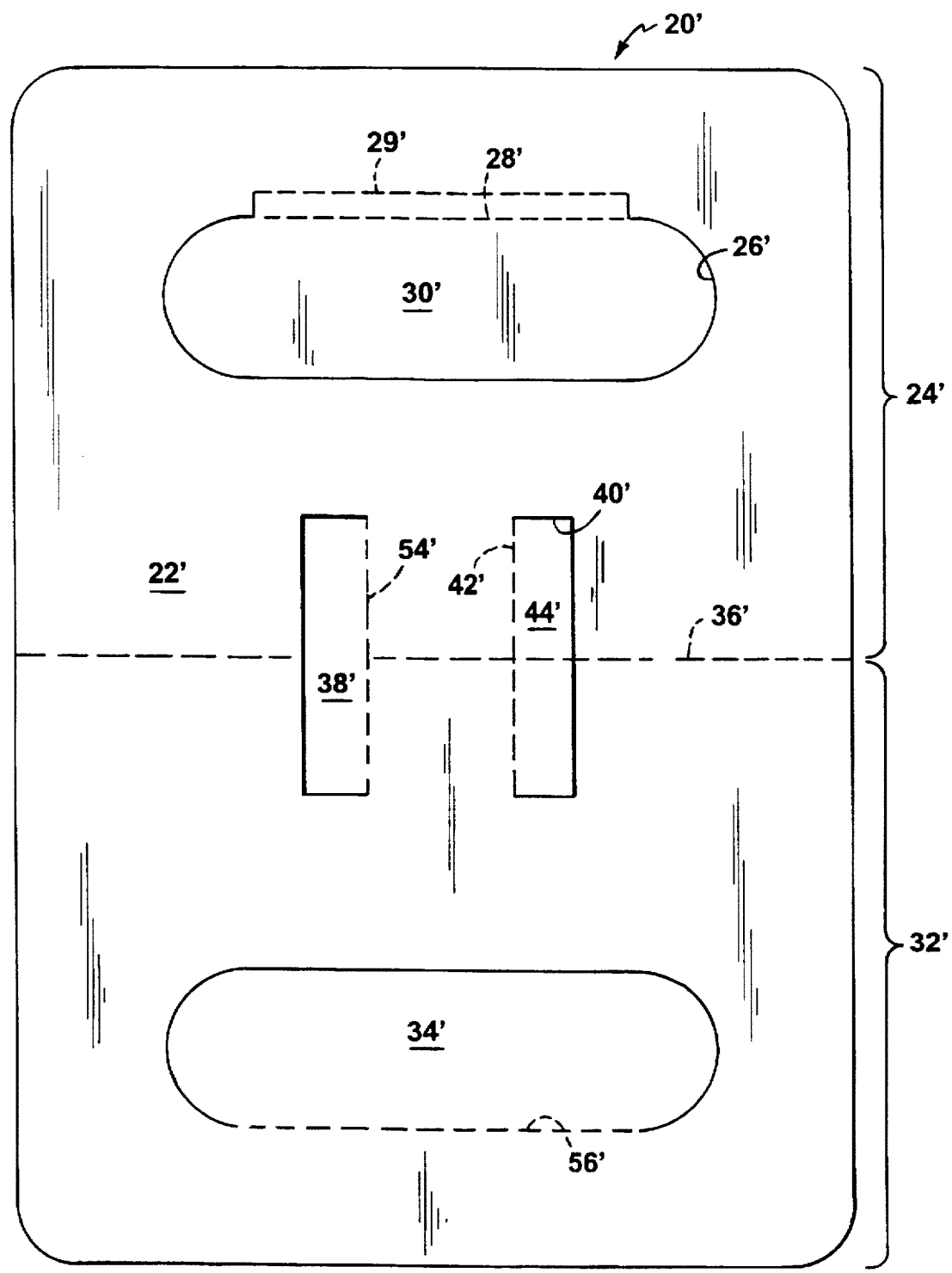
FIG. 8 is a plan view of a blank for forming the garment carrier of FIG. 7.

Other preferred embodiments of garment carriers of the invention may have other dimensions, with orifices of other shapes or sizes. For example, referring to FIGS. 7 and 8, a garment carrier 10' of the invention has orifices 26', 34', 38' and 40', the orifices 38' and 40' in this embodiment having generally the same size and shape, with the free end, E, of the hanger hook, G, being inserted from either direction. A blank 20' for forming a garment carrier 10' is shown in FIG. 8. Again, by way of example only, in this preferred embodiment, the body 22' of blank 20' is about 7¼ inches high and about 4 inches wide. The first orifice 26' is about 2½ inches wide by about ⅞ inch high. The second orifice 34' is also about 2½ inches wide by about ⅞ inch high. The third orifice 38' is about ⅛ inch wide and about 2¼ inches high. The fourth orifice 40 is also about ⅛ inch wide and about 2¼ inches high.

Other embodiments are within the following claims. For example, the upper portion 24 and lower portion 32 may be secured together in folded state by a fastener, e.g. a staple 50 (FIG. 1) or an adhesive region 52' (FIG. 7). The blank material of third orifice 38' may be folded along a fold line 54' (FIG. 8) to provide a second hanger flap, or hanger flap 44, 44' may be omitted (e.g. by removal of material during formation of the blank 20'). The blank material of second orifice 34' may be folded along a fold line 56' (FIG. 8) to provide a second handle flap, or the handle flap 30 may also be omitted.

What is claimed is:

1. A garment carrier formed of a thin piece of material, comprising a body having an upper region defining a handle opening extending therethrough, and a lower region defining a third orifice and a fourth orifice for receiving a free end of one or more garment hanger hooks therethrough, said body formed by an upper portion defining a first orifice extending therethrough and a lower portion defining a second orifice extending therethrough, said upper portion and said lower portion being joined in a hinged connection along a first edge and fold line, said first orifice and said second orifice being disposed in overlapping relationship and defining said handle opening, and said third orifice having a first region defined by said upper portion and a second region defined by said lower portion, said third orifice being intersected by said first edge and fold line, said third orifice having its said first region and its said second region generally in overlapping relationship and defining a first hanger opening, and said fourth orifice having a first region defined by said upper portion and a second region defined by said lower portion, said fourth orifice being intersected by said first edge and fold line, said fourth orifice having its said first region and its said second region generally in overlapping relationship and defining a second hanger opening.

2. The garment carrier of claim 1 further comprising a handle flap joined to said body in a hinged connection along a generally horizontal edge and fold line of at least one of said first orifice and said second orifice.

3. The garment carrier of claim 2 further comprising an exposed handle surface defined by said handle flap between said generally horizontal edge and fold line and a second generally horizontal edge and fold line lying generally parallel thereto.

4. The garment carrier of claim 3 wherein said handle flap is disposed to extend through said first orifice and said second orifice.

5. The garment carrier of claim 2 wherein said handle flap is formed by material of said body dislodged from one of said first orifice and said second orifice.

6. The garment carrier of claim 1 further comprising a first handle flap joined to said body in a hinged connection along a lower, generally horizontal edge and fold line of said first orifice and a second handle flap joined to said body in a hinged connection along a lower, generally horizontal edge and fold line of said second orifice.

7. The garment carrier of claim 1, 2 or 6 further comprising a hanger flap joined to said body in a hinged connection along a generally vertical edge and fold line of at least one of said third orifice and said fourth orifice.

8. The garment carrier of claim 7 wherein said hanger flap is formed by material of said body dislodged from one of said third orifice and said fourth orifice.

9. The garment carrier of claim 1, 2 or 6 further comprising a first hanger flap joined to said body in a hinged connection along a first, generally vertical edge and fold line of said third orifice and a second hanger flap joined to said body in a hinged connection along a second, generally vertical edge and fold line of said fourth orifice.

10. The garment carrier of claim 1, 2 or 6 further comprising a securement element releasably joining said upper portion of said body with said lower portion of said body in face-to-face relationship.

11. The garment carrier of claim 1 wherein said thin piece of material is formed of a biodegradable material.

12. The garment carrier of claim 11 wherein said material is corrugated cardboard.

13. The garment carrier of claim 1 or 11 wherein said material is plastic.

14. A blank of corrugated cardboard and the like for forming a garment carrier, comprising a body having an upper portion defining a first orifice extending therethrough, and a lower portion defining a second orifice extending therethrough, said upper portion and said lower portion being joined in a hinged connection along a first edge and fold line, said first orifice and said second orifice, with said blank in a first, flat state, being spaced uniformly at opposite sides from said first edge, and said first orifice and said second orifice, with said blank in a second, folded state at said first edge and fold line, being disposed in overlapping relationship and defining a handle opening, and said body further defining a third orifice extending therethrough and a fourth orifice extending therethrough, a first region of said third orifice being defined by said upper portion and a second region of said third orifice being defined by said lower portion, said third orifice being intersected by said first edge and fold line, a first region of said fourth orifice being defined by said upper portion and a second region of said fourth orifice being defined by said lower portion, said fourth orifice being intersected by said first edge and fold line, said third orifice, with said blank in said second, folded state at said first edge and fold line, having its said first region and its said second region generally in overlapping relationship and defining a first hanger opening, and said fourth orifice, with said blank in said second, folded state at said first edge and fold line, having its said first region and its said second region generally in overlapping relationship and defining a second hanger opening.

15. The blank of claim 14 wherein said first orifice has an upper, generally horizontal edge and fold line, and said blank further comprises a first handle flap, and said upper portion and said first handle flap being joined in a hinged connection along said upper, generally horizontal edge and fold line.

16. The blank of claim 14 or 15 wherein said second orifice has a lower, generally horizontal edge and fold line, and said blank further comprises a second handle flap having a surface, and said lower portion and said second handle flap being joined in a hinged connection along said lower, generally horizontal edge and fold line.

17. The blank of claim 15 wherein said first orifice has a second, upper, generally horizontal edge and fold line lying generally parallel to said first upper, generally horizontal edge with an exposed handle surface defined therebetween by said handle flap.

18. The blank of claim 14 wherein at least one of said third orifice and said fourth orifice has a generally vertical side edge and fold line, and said blank further comprises a first hanger flap, and said upper portion and said lower portion and said first hanger flap being joined in a hinged connection along said generally vertical side edge and fold line.

19. The blank of claim 14 wherein said third orifice has a first generally vertical side edge and fold line and said fourth orifice has a second generally vertical side edge and fold line, and said blank further comprises a first hanger flap at said third orifice and a second hanger flap at said fourth orifice, said upper portion and said lower portion and said first hanger flap being joined in a hinged connection along said first generally vertical side edge and fold line and said upper portion and said lower portion and said second hanger flap being joined in a hinged connection along said second generally vertical side edge and fold line.

20. The blank of claim 14 wherein said thin piece of material is formed of a biodegradable material.

21. The blank of claim 14, wherein said first edge and fold line is a first horizontal edge and fold line.

22. The blank of claim 21 wherein said first horizontal edge and fold line generally bisects said body.

23. The blank of claim 21 wherein said first horizontal edge and fold line generally bisects said third orifice.

24. The blank of claim 21 or 16 wherein said first horizontal edge and fold line generally bisects said fourth orifice.

25. A method for engaging a garment hanger hook in a blank for forming a garment carrier to transport a garment on the hanger, said method comprising the steps of, with the blank comprising a body having an upper portion defining a first orifice extending therethrough, and a lower portion defining a second orifice extending therethrough, said upper portion and said lower portion being joined in a hinged connection along a first edge and fold line, and said body further defining a third orifice extending therethrough and a fourth orifice extending therethrough, a first region of said third orifice being defined by said upper portion and a second region of said third orifice being defined by said lower portion, said third orifice being intersected by said first edge and fold line, and a first region of said fourth orifice being defined by said upper portion and a second region of said fourth orifice being defined by said lower portion, said fourth orifice being intersected by said first edge and fold line, inserting a free end of the hanger hook through one of the third orifice and the fourth orifice in a first direction relative to a plane of the body and then through the other of the third orifice and the fourth orifice in a second direction relative to a plane of the body, the second direction being opposite to the first direction, folding the body at the first edge and fold line to bring the upper portion of the body into opposition to the lower portion of the body, with a mid-region of the hanger hook extending between the third and fourth orifices disposed therebetween, and securing the upper portion to the lower portion, with the first and second orifices in overlapping relationship to form a handle opening.

26. The method of claim 25 comprising the further step of dislodging material from at least one of the first orifice and the second orifice along a generally horizontal hinge and fold line joining the dislodged material to the body, the dislodged material forming a handle flap extending through the first and second orifices and defining an exposed handle surface for cushioning the load.

27. The method of claim 25 or 26 comprising the further step of dislodging material from at least one of the third orifice and the fourth orifice along a generally vertical hinge and fold line joining the dislodged material to the body, the dislodged material forming a hanger flap for reinforcing the garment hanger hook carrying region.

28. The method of claim 25, wherein said first edge and fold line is a first horizontal edge and fold line.

29. The garment carrier of claim 1, wherein said first edge and fold line is a first horizontal edge and fold line.

\* \* \* \* \*